United States Patent
Niida et al.

(10) Patent No.: US 7,136,427 B2
(45) Date of Patent: Nov. 14, 2006

(54) METHOD AND APPARATUS FOR ADAPTIVE MODULATION USING SPACE-TIME BLOCK CODE MATRIX

(75) Inventors: Sumaru Niida, Saitama (JP); Toshinori Suzuki, Saitama (JP); Yoshio Takeuchi, Saitama (JP)

(73) Assignee: KDDI Corporation, Tokyo (JP)

( * ) Notice: Subject to any disclaimer, the term of this patent is extended or adjusted under 35 U.S.C. 154(b) by 759 days.

(21) Appl. No.: 10/347,292

(22) Filed: Jan. 21, 2003

(65) Prior Publication Data

US 2003/0161412 A1    Aug. 28, 2003

(30) Foreign Application Priority Data

Feb. 26, 2002  (JP)  ............................. 2002-049470

(51) Int. Cl.
*H04L 27/04* (2006.01)
*H04L 27/12* (2006.01)
*H04L 27/20* (2006.01)

(52) U.S. Cl. ........................................ 375/299; 375/295

(58) Field of Classification Search ................ 375/299, 375/347, 267, 295, 135, 146; 455/101
See application file for complete search history.

(56) References Cited

U.S. PATENT DOCUMENTS

| | | | | |
|---|---|---|---|---|
| 6,661,856 | B1* | 12/2003 | Calderbank et al. | ........ 375/347 |
| 6,889,355 | B1* | 5/2005 | Calderbank et al. | ........ 714/792 |
| 2002/0186796 | A1* | 12/2002 | McFarland et al. | ......... 375/341 |
| 2003/0072395 | A1* | 4/2003 | Jia et al. | .................... 375/341 |

OTHER PUBLICATIONS

Tarokh et al. "Space-time block coding for wireless communications: performance results" IEEE Journal on Selected Areas in Communications, vol. 17, Issue 3, Mar. 1999, pp. 451-460.*
Vahid Tarokh, et al., "Space-Time Block Coding For Wireless Communications: Performance Results", IEEE Journal on Selected Areas in Communications, vol. 17, #3, Mar. 1999, pp. 451-460.

* cited by examiner

*Primary Examiner*—Mohammed Ghayour
*Assistant Examiner*—Aslan Ettehadieh
(74) *Attorney, Agent, or Firm*—Oblon, Spivak, McClelland, Maier & Neustadt, P.C.

(57) ABSTRACT

A method of transmitting adaptive modulation signals using space-time block code matrix from a plurality of antennas, the method comprising the steps of: changing adaptively the number of transmission repeat times of the matrix according to a propagation condition, transforming modulation signals at each transmission repeat timing from each antenna by using the matrix, and sending the transformed signals at each transmission repeat timing from each antenna.

13 Claims, 4 Drawing Sheets

METHOD AND APPARATUS FOR ADAPTIVE MODULATION USING SPACE-TIME BLOCK CODE MATRIX

FIELD OF THE INVENTION

The present invention relates to a method and an apparatus for adaptive modulation using ST (space-time) block code matrix. In particular, the present invention is provided in a mobile communication system for changing a coding scheme according to a propagation condition.

DESCRIPTION OF THE RELATED ART

In the wireless communication, MIMO (Multi-Input/Multi-Output) technique for transmitting and receiving signals by using a plurality of antennas has attracted attention at present. In the technique, a space-time coding scheme transmits simultaneously different signals in same frequency band by using a plurality of transmitting antennas. The space-time coding scheme can prevent a propagation quality from becoming worse by fading because of both a space-diversity effect and a time-diversity effect. Vahid Tarokh et al., "Space-Time Block Coding for Wireless Communications: Performance Results", IEEE J. SAC, Vol.17, No.3, March 1999, p.451–p.460 describes for the ST block coding. The ST block coding scheme is for repeatability transmitting the signals that a transmission symbol is transformed linearly. Thereby, a good performance is provided over a fading channel.

FIG. 1 shows a block diagram schematically illustrating a transmitting apparatus by the conventional ST block coding scheme.

According to FIG. 1, transmitting information bits are inputted to a modulator 12. The modulator 12 maps the information bits to modulation symbols such as PSK (Phase Shift Keying) or QAM (Quadrature Amplitude Modulation). Then, the ST block coding is performed for the transmitting signal, and the signal is transmitted from each antenna. The ST block encoder is represented as a matrix (1) as follows for example.

$$\begin{pmatrix} x_1 & x_2 \\ -x_2^* & x_1^* \end{pmatrix} \quad (1)$$

The matrix (1) shows two-repeat of symbol for two antennas. The "$x_1$" and "$x_2$" means the symbols outputted from the PSK/QAM modulator 12, and are expressed by complex. Each column of the matrix represents a transmitting antenna, and each row represents a symbol timing to be transmitted simultaneously at a same time slot. According to the matrix (1), at first, the symbol "$x_1$" is transmitted from a first antenna, and simultaneously, the symbol "$x_2$" is transmitted from a second antenna. At the next timing, the symbol "$-x_2^*$" is transmitted from the first antenna, and simultaneously, the symbol "$x_1^*$" is transmitted from the second antenna. In addition, the "*" means a complex conjugate.

The equation (2) shows a signal received by the receiving antenna j through a fading channel.

$$d_j^t = \sum_{i=1}^{n} \alpha_{i,j}^t c_i^t + \eta_j^t \quad (2)$$

The system is assumed to provide N transmitting antennas and M receiving antennas.

The $d_j^t$ means a signal received by antenna j at time slot t. These are corresponding to the elements "$x_1$" and "$x_2$" in the matrix (1).

The $c_i^t$ (i=1, 2, ..., N) means a symbol transmitted from transmitting antenna i at time slot t. The $c_i^t$ is the element (t,i) of the matrix. Each symbol is transmitted simultaneously from different transmitting antennas. The signals transmitted from the transmitting antennas are subjected to different fading at each time received by the receiving antenna.

The $\alpha_{i,j}^t$ means a fading status of a channel between the transmitting antenna i and the receiving antenna j at time slot t.

The $\eta_j^t$ means a receiver's thermal noise of antenna j at time slot t.

If such a propagation condition is assumed, the transmitted signals $S_1$ and $S_2$ are estimated of making a result of expression (3) as follows the minimum.

$$\sum_{j=1}^{m} \left( |d_j^1 - \alpha_{1,j}^1 s_1 - \alpha_{2,j}^1 s_2|^2 + |d_j^2 - \alpha_{1,j}^2 s_2^* - \alpha_{2,j}^2 s_1^*|^2 \right) \quad (3)$$

For example, a following matrix (4) shows eight-repeat of symbol for four antennas. In particular, the matrix (4) shows the ST block coding with four input symbols per a ST symbol.

$$\begin{pmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \\ x_1^* & x_2^* & x_3^* & x_4^* \\ -x_2^* & x_1^* & -x_4^* & x_3^* \\ -x_3^* & x_4^* & x_1^* & -x_2^* \\ -x_4^* & -x_3^* & x_2^* & x_1^* \end{pmatrix} \quad (4)$$

If the system does not compensate a propagation condition by a transmitting power control, the signal-to-noise ratio by the receiving apparatus always fluctuates. In such case, an adaptive-coding method for changing the coding scheme according to a propagation condition becomes effective. The ST block coding is dependent only on the coding rate of PSK/QAM modulation. Since a coding rate is fixed according to the conventional ST block coding, a throughput is not optimized under the mobile communication environment where a propagation condition changes.

SUMMARY OF THE INVENTION

The invention solves the above-mentioned problem, and aims to provide the adaptive-coding method and transmitting apparatus using the ST block coding that the coding rate is changed according to the propagation condition in the mobile-communications system.

The present invention concerns a method of adaptive modulation using space-time block code matrix from a plurality of antennas. According to the present invention, the method comprising the steps of:

changing adaptively the number of transmission repeat times of the matrix according to a propagation condition, transforming modulation signals at each transmission repeat timing from each antenna by using the matrix, and sending the transformed signals at each transmission repeat timing from each antenna.

The present invention concerns a method of adaptive modulation using space-time block code matrix $$\begin{pmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \\ x_1^* & x_2^* & x_3^* & x_4^* \\ -x_2^* & x_1^* & -x_4^* & x_3^* \\ -x_3^* & x_4^* & x_1^* & -x_2^* \\ -x_4^* & -x_3^* & x_2^* & x_1^* \end{pmatrix}$$

from four-antennas, columns are each antenna, rows are each transmission repeat timing, and "*" is a complex conjugate. According to the present invention, the method comprising the steps of:

changing adaptively the number of transmission repeat times of the matrix according to a propagation condition as follows, $$\begin{pmatrix} x_1 & x_2 & x_3 & x_4 \\ -x_2^* & x_1^* & -x_4^* & x_3^* \\ -x_3 & x_4 & x_1 & -x_2 \\ -x_4^* & -x_3^* & x_2^* & x_1^* \\ x_1^* & x_2^* & x_3^* & x_4^* \\ -x_2 & x_1 & -x_4 & x_3 \\ -x_3^* & x_4^* & x_1^* & -x_2^* \\ -x_4 & -x_3 & x_2 & x_1 \end{pmatrix},$$

$$\begin{pmatrix} x_1 & x_2 & x_3 & x_4 \\ -x_2^* & x_1^* & -x_4^* & x_3^* \\ -x_3 & x_4 & x_1 & -x_2 \\ -x_4^* & -x_3^* & x_2^* & x_1^* \end{pmatrix} \text{ or}$$

$$\begin{pmatrix} x_1 & x_2 & x_3 & x_4 \\ -x_2^* & x_1^* & -x_4^* & x_3^* \end{pmatrix}$$

transforming modulation signals "$x_1$"–"$x_n$" at each transmission repeat timing from each antennas by using the matrix, and sending the transformed signals at each transmission repeat timing from each antenna.

It is preferred that the number of driving antennas is changed adaptively according to the propagation condition.

It is preferred that a modulation rate of the modulation symbols is changed.

It is preferred that the propagation condition is of measured by a receiving side.

It is preferred that the propagation condition is of measured by a transmitting side.

It is preferred that the method comprising the steps of: in a transmitting side, interleaving the transmitting signal between antennas, and in a receiving side, de-interleaving a received signal.

The present invention concerns an apparatus for adaptive modulation using space-time block code matrix from a plurality of antennas. According to the present invention, the apparatus comprising:

means for changing adaptively the number of transmission repeat times of the matrix according to a propagation condition, means for transforming modulation signals at each transmission repeat timing from each antenna by using the matrix, and means for sending the transformed signals at each transmission repeat timing from each antenna.

The present invention concerns an apparatus for adaptive modulation using space-time block code matrix $$\begin{pmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \\ x_1^* & x_2^* & x_3^* & x_4^* \\ -x_2^* & x_1^* & -x_4^* & x_3^* \\ -x_3^* & x_4^* & x_1^* & -x_2^* \\ -x_4^* & -x_3^* & x_2^* & x_1^* \end{pmatrix}$$

from four-antennas, columns are each antenna, rows are each transmission repeat timing, and "*" is a complex conjugate. According to the present invention, the apparatus comprising:

means for changing adaptively the number of transmission repeat times of the matrix according to a propagation condition as follows, $$\begin{pmatrix} x_1 & x_2 & x_3 & x_4 \\ -x_2^* & x_1^* & -x_4^* & x_3^* \\ -x_3 & x_4 & x_1 & -x_2 \\ -x_4^* & -x_3^* & x_2^* & x_1^* \\ x_1^* & x_2^* & x_3^* & x_4^* \\ -x_2 & x_1 & -x_4 & x_3 \\ -x_3^* & x_4^* & x_1^* & -x_2^* \\ -x_4 & -x_3 & x_2 & x_1 \end{pmatrix}$$

$$\begin{pmatrix} x_1 & x_2 & x_3 & x_4 \\ -x_2^* & x_1^* & -x_4^* & x_3^* \\ -x_3 & x_4 & x_1 & -x_2 \\ -x_4^* & -x_3^* & x_2^* & x_1^* \end{pmatrix} \text{ or}$$

$$\begin{pmatrix} x_1 & x_2 & x_3 & x_4 \\ -x_2^* & x_1^* & -x_4^* & x_3^* \end{pmatrix}$$

means for transforming modulation signals "$x_1$"–"$x_n$" at each transmission repeat timing from each antennas by using the matrix, and means for sending the transformed signals at each transmission repeat timing from each antenna.

It is preferred that the apparatus comprising means for changing the number of driving antennas adaptively according to the propagation condition.

It is preferred that the apparatus comprising means for changing a modulation rate of the modulation symbols.

It is preferred that the apparatus comprising means for measuring the propagation condition.

It is preferred that the apparatus comprising means for interleaving the transmitting signal between antennas.

DESCRIPTION OF THE PREFERRED EMBODIMENTS

The adaptive coding method by the present invention provides fundamentally a coding rate according to a propagation condition by changing the number of symbol-repeat times of the ST block coding. According to the matrix (4) by the conventional ST block coding method, since four symbols with PSK/QAM modulation are transmitted simultaneously. Thus, the coding rate by the conventional ST block coding method is as half of the coding rate by the PSK/QAM modulation which is used for each symbol. On the other hand, the present invention increases the coding rate by decreasing the number of symbol-repeat times.

However, it is obvious that an error rate declines by decreasing the number of symbol-repeat times as mentioned above. Therefore, the present invention satisfies the required error rate by increasing the number of symbol-repeat times under an inferior propagation condition with small signal-to-noise ratio. Conversely, the present invention raises a data rate by reducing the number of symbol-repeat times under the good propagation condition with large signal-to-noise ratio.

Furthermore, the present invention provides the more finely adaptive control according to the propagation condition by adaptively changing a modulation rate of each symbol. Moreover, of course, it also can be applied to the ST block coding of two or three of antennas. Thus, the adaptive coding can be implemented by combining the ST block coding of the different number of antennas.

Figure 1:
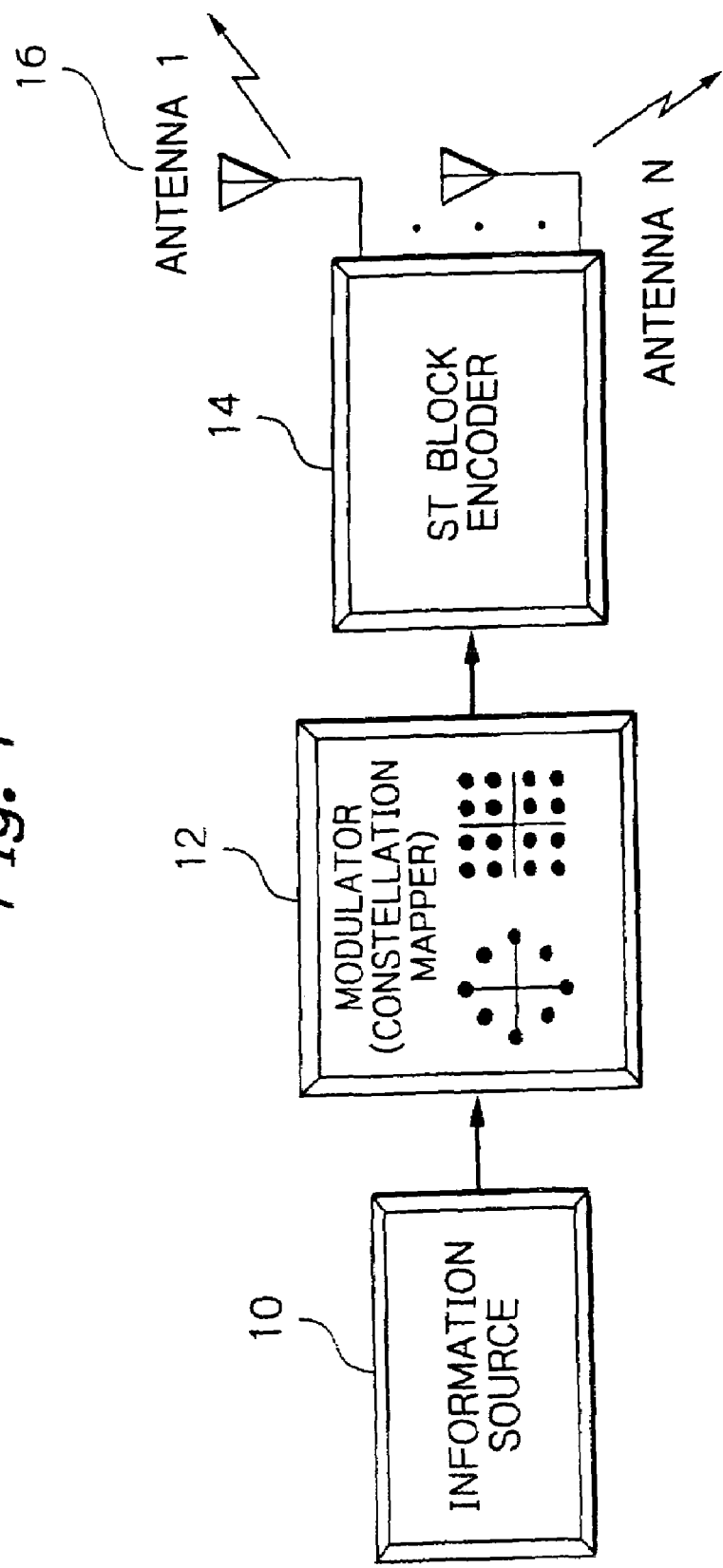
FIG. 1 shows a block diagram schematically illustrating a transmitting apparatus by the conventional ST block coding method.
Figure 2:
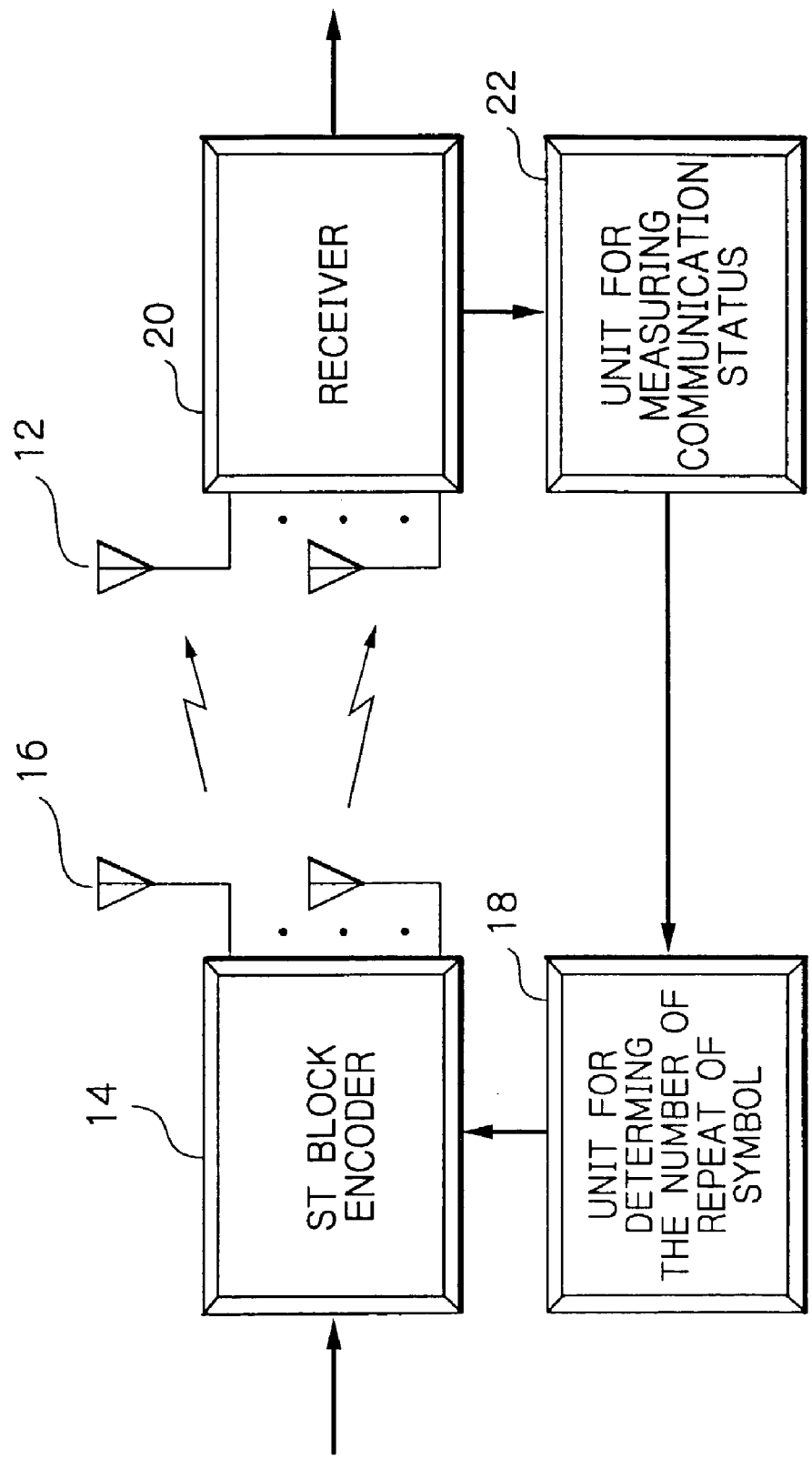
FIG. 2 shows a block diagram schematically illustrating a transmitting apparatus and a receiving apparatus according to the present invention.

FIG. 2 shows a block diagram schematically illustrating a transmitting apparatus and a receiving apparatus according to the present invention.

According to FIG. 2, the transmitting apparatus encodes a transmitting signal by the ST block coding, and transmits the signals by using a plurality of the antennas. Then, the number of symbol-repeat times is changed according to the signal-to-noise ratio. Therefore, the receiving apparatus transmits measured information of signal-to-noise ratio to the transmitting apparatus. On the other hand, the transmitting apparatus controls the number of symbol-repeat times of the ST block coding based on the signal-to-noise ratio.

In addition, based on the signal-to-noise ratio measured in the transmitting apparatus, the number of symbol-repeat times may be controlled. Furthermore, the PSK/QAM modulation may be executed for the transmitting signal error-corrected before performing the ST block coding.

Furthermore, the transmitting apparatus may interleave the transmitting signal between antennas, and the receiving apparatus may de-interleave the received signal.

For example, a matrix (5) shows the transmitting matrix of the ST block coding with eight-repeat of symbol. In addition, matrixes (6)–(8) show the matrix of the coding with four-repeat, two-repeat and one-repeat of symbol. For the coding of eight-repeat, the coding of four-repeat obtains the coding rate of two times, the coding of two-repeat obtains the coding rate of four times, and the coding of one-repeat obtains the coding rate of eight times. Assuming the QPSK (Quadrature Phase Shift Keying) for each transmission symbol is used, the coding rate will become 1, 2, 4 and 8 [b/s/Hz] respectively for eight-repeat, four-repeat, two-repeat and one repeat.

$$\begin{pmatrix} x_1 & x_2 & x_3 & x_4 \\ -x_2^* & x_1^* & -x_4^* & x_3^* \\ -x_3 & x_4 & x_1 & -x_2 \\ -x_4^* & -x_3^* & x_2^* & x_1^* \\ x_1^* & x_2^* & x_3^* & x_4^* \\ -x_2 & x_1 & -x_4 & x_3 \\ -x_3^* & x_4^* & x_1^* & -x_2^* \\ -x_4 & -x_3 & x_2 & x_1 \end{pmatrix} \quad (5)$$

$$\begin{pmatrix} x_1 & x_2 & x_3 & x_4 \\ -x_2^* & x_1^* & -x_4^* & x_3^* \\ -x_3 & x_4 & x_1 & -x_2 \\ -x_4^* & -x_3^* & x_2^* & x_1^* \end{pmatrix} \quad (6)$$

$$\begin{pmatrix} x_1 & x_2 & x_3 & x_4 \\ -x_2^* & x_1^* & -x_4^* & x_3^* \end{pmatrix} \quad (7)$$

$$(x_1 x_2 x_3 x_4) \quad (8)$$

The matrixes (5)–(7) are an example of the present invention, and are optimum combination matrixes chosen according to a simulation result by the inventors.

Here, assuming a propagation status is given by the equation (2), the receiving apparatus decodes a received signal according to expressions (9)–(12) as follows. The expression (9) corresponds to the matrix (5), the expression (10) corresponds to the matrix (6), the expression (11) corresponds to the matrix (7), and the expression (12) corresponds to the matrix (8), respectively. When a propagation loss exists between the transmitting apparatus and the receiving apparatus, there are calculated including a fading fluctuation. Furthermore, as for the matrix (9), it is also possible to reduce a computational complexity by a demodulation of the conventional ST block coding.

$$\sum_{j=1}^{m} \left( |d_j^1 - \alpha_{1,j}^1 x_1 - \alpha_{2,j}^1 x_2 - \alpha_{3,j}^1 x_3 - \alpha_{4,j}^1 x_4|^2 + |d_j^2 + \alpha_{1,j}^2 x_2^* - \alpha_{2,j}^2 x_1^* + \alpha_{3,j}^2 x_4^* - \alpha_{4,j}^2 x_3^*|^2 + \right.$$

$$|d_j^3 + \alpha_{1,j}^3 x_3 - \alpha_{2,j}^3 x_4 - \alpha_{3,j}^3 x_1 + \alpha_{4,j}^3 x_2|^2 + |d_j^4 + \alpha_{1,j}^4 x_4^* + \alpha_{2,j}^4 x_3^* - \alpha_{3,j}^4 x_2^* - \alpha_{4,j}^4 x_1^*|^2 +$$

$$|d_j^5 - \alpha_{1,j}^5 x_1 - \alpha_{2,j}^5 x_2 - \alpha_{3,j}^5 x_3 - \alpha_{4,j}^5 x_4|^2 + |d_j^6 + \alpha_{1,j}^6 x_2 - \alpha_{2,j}^6 x_1 + \alpha_{3,j}^6 x_4 - \alpha_{4,j}^6 x_3|^2 +$$

$$\left. |d_j^7 + \alpha_{1,j}^7 x_3^* - \alpha_{2,j}^7 x_4^* - \alpha_{3,j}^7 x_1^* + \alpha_{4,j}^7 x_2^*|^2 + |d_j^8 + \alpha_{1,j}^8 x_4 + \alpha_{2,j}^8 x_3 - \alpha_{3,j}^8 x_2 - \alpha_{4,j}^8 x_1|^2 \right) \quad (9)$$

$$\sum_{j=1}^{m} \left( |d_j^1 - \alpha_{1,j}^1 x_1 - \alpha_{2,j}^1 x_2 - \alpha_{3,j}^1 x_3 - \alpha_{4,j}^1 x_4|^2 + |d_j^2 + \alpha_{1,j}^2 x_2^* - \alpha_{2,j}^2 x_1^* + \alpha_{3,j}^2 x_4^* - \alpha_{4,j}^2 x_3^*|^2 + \right.$$

$$\left. |d_j^3 + \alpha_{1,j}^3 x_3 - \alpha_{2,j}^3 x_4 - \alpha_{3,j}^3 x_1 + \alpha_{4,j}^3 x_2|^2 + |d_j^4 + \alpha_{1,j}^4 x_4^* + \alpha_{2,j}^4 x_3^* - \alpha_{3,j}^4 x_2^* - \alpha_{4,j}^4 x_1^*|^2 \right) \quad (10)$$

$$\sum_{j=1}^{m} \left( |d_j^1 - \alpha_{1,j}^1 x_1 - \alpha_{2,j}^1 x_2 - \alpha_{3,j}^1 x_3 - \alpha_{4,j}^1 x_4|^2 + |d_j^2 + \alpha_{1,j}^2 x_2^* - \alpha_{2,j}^2 x_1^* + \alpha_{3,j}^2 x_4^* - \alpha_{4,j}^2 x_3^*|^2 \right) \quad (11)$$

$$\sum_{j=1}^{m} |d_1^j - \alpha_{1,j} x_1 - \alpha_{2,j} x_2 - \alpha_{3,j} x_3 - \alpha_{4,j} x_4|^2 \quad (12)$$

Figure 3:
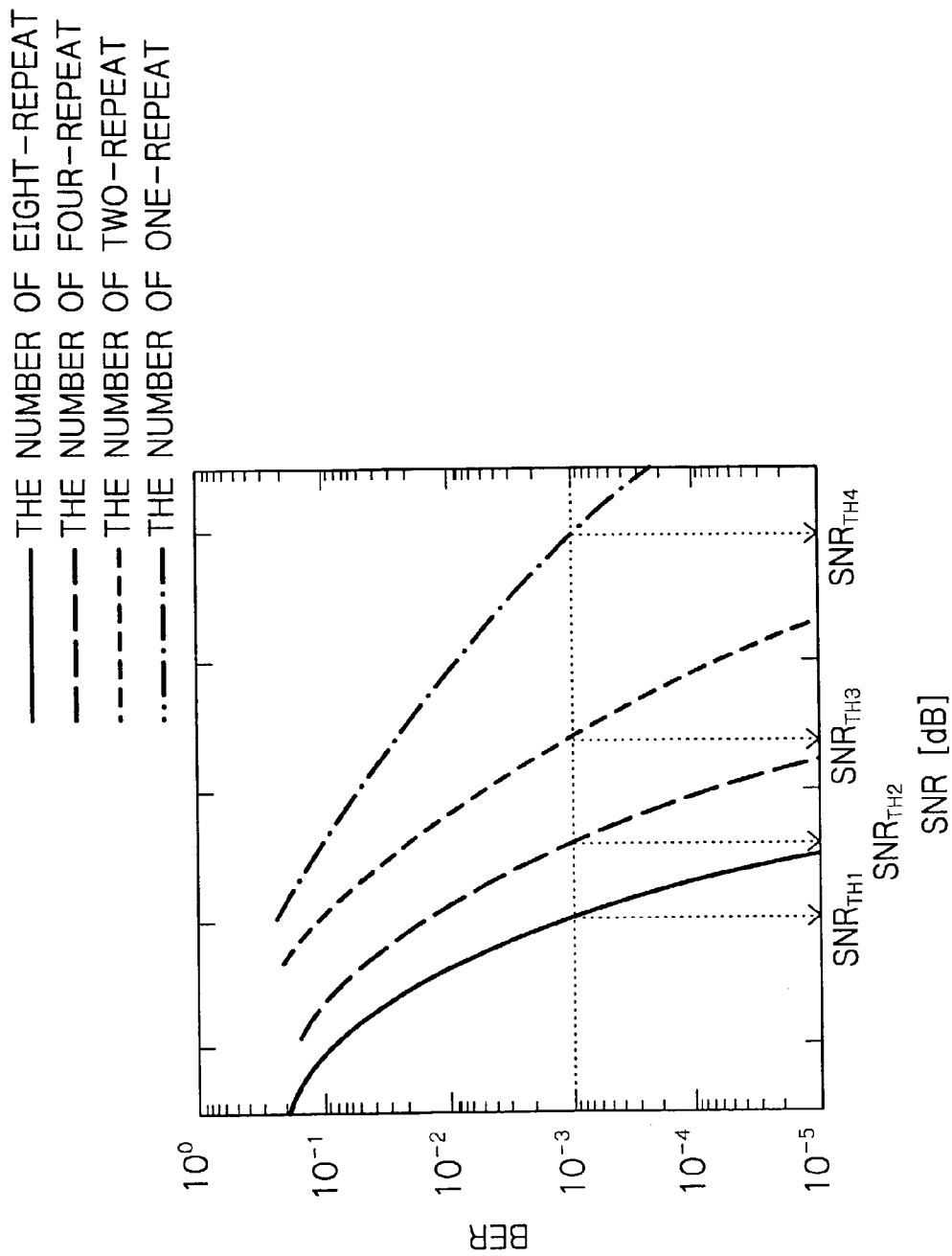
FIG. 3 shows an error rate graph by the number of the symbol-repeat times for the adaptive-coding method of the present invention.

FIG. 3 shows an error rate graph by the number of the symbol-repeat times for the adaptive-coding method of the present invention.

According to FIG. 3, a target signal-to-noise ratio by a given bit error rate is calculated, and the number of symbol-repeat times for transmission is determined by using the signal-to-noise ratio as a threshold. Then, before changing the number of symbol-repeat times for transmission, the transmitting apparatus is necessary to notice the number of symbol-repeat times for transmission to the receiving apparatus.

SNR<$SNR_{TH1}$: eight-repeat of symbol
$SNR_{TH1}$≦SNR<$SNR_{TH2}$: four-repeat of symbol
$SNR_{TH2}$≦SNR<$SNR_{TH3}$: two-repeat of symbol
$SNR_{TH3}$≦SNR: one-repeat of symbol In addition to above-mentioned embodiments, it considers the adaptive ST block coding by the different number of transmitting antennas.

An adaptive coding is performed by using the matrix of one symbol-repeat, the matrix (1) of two transmitting antennas, and the matrixes (5)–(8) of the adaptive-coding method. Assuming the transmit power in each antenna is fixed, when the number of transmitting antennas is two, the total transmit power will serve as half it that the number of transmitting antennas is four. Thereby, the power consumption and the interference to other apparatus can be made into a half.

The coding rate of each coding method is given as follows, when the modulation method is QPSK.

| two antennas, eight-repeat of symbol | 1[b/s/Hz] |
| four antennas, four-repeat of symbol | 2[b/s/Hz] |
| four antennas, two-repeat of symbol | 4[b/s/Hz] |
| four antennas, one-repeat of symbol | 8[b/s/Hz] |
| four antennas, two-repeat of symbol | 2[b/s/Hz] |
| two antennas, one-repeat of symbol | 4[b/s/Hz] |

Figure 4:
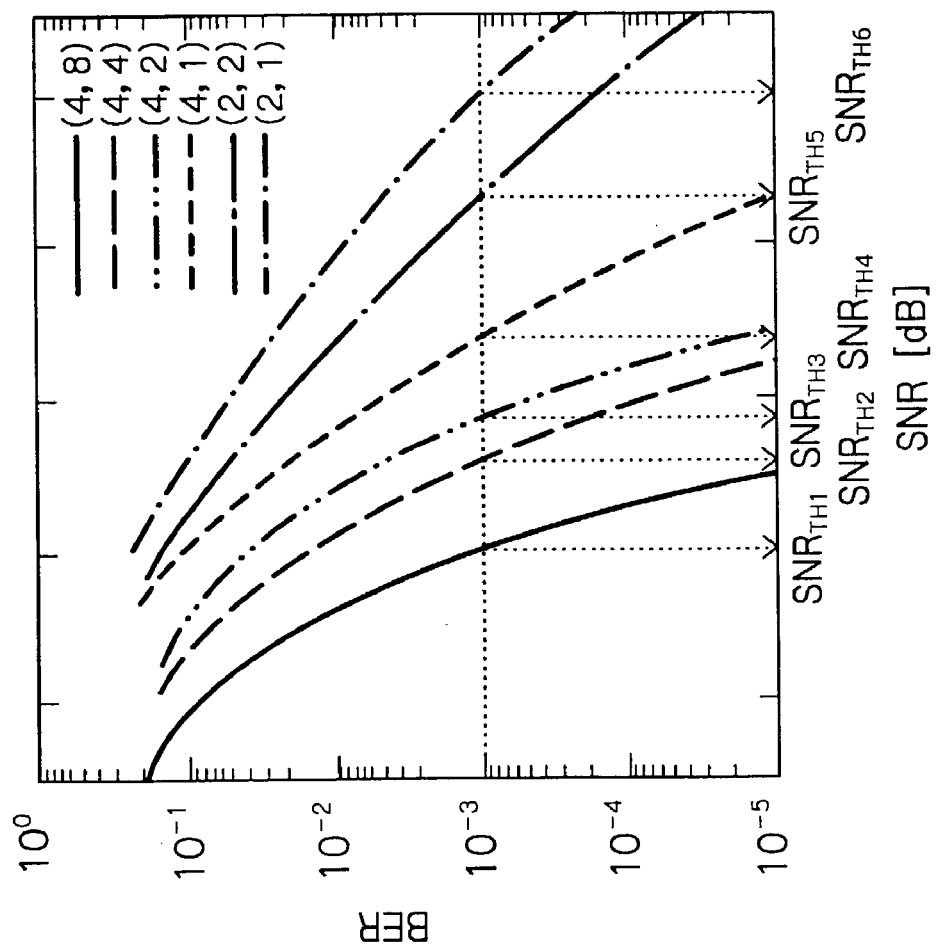
FIG. 4 shows an error rate graph by the number of the symbol-repeat times for the number of antennas according to the present invention.

FIG. 4 shows an error rate graph by the number of symbol-repeat times for the number of antennas according to the present invention.

According to FIG. 4, as for (M,N), where "M" means the number of transmitting antennas, and where "N" means the number of symbol-repeat times.

SNR<$SNR_{TH1}$: four antennas, eight-repeat of symbol
$SNR_{TH1}$≦SNR<$SNR_{TH2}$: four antennas, four-repeat of symbol
$SNR_{TH2}$≦SNR<$SNR_{TH3}$: two antennas, two-repeat of symbol
$SNR_{TH3}$≦SNR<$SNR_{TH4}$: four antennas, two-repeat of symbol
$SNR_{TH4}$≦SNR<$SNR_{TH5}$: two antennas, one-repeat of symbol
$SNR_{TH5}$≦SNR: four antennas, one-repeat of symbol According to FIG. 4, four antennas and four-repeat of symbol, and two antennas and two-repeat of symbol, are coded with same coding rate. In this case, a transmit power, a consumption power, and an interference to other station are made to half by using two transmitting antennas. Thus, when the high signal-to-noise ratio is obtained in the receiving apparatus, it is effective to reduce the number of antennas. Furthermore, when the signal-to-noise ratio of each antenna can be known in the transmitting apparatus, it is also possible to select two antennas with a best propagation condition among four antennas.

Furthermore, in addition to the above-embodiment, the modulation rate of each transmission symbol may be changed. When a propagation condition is inferior, the number of repeat times is made to eight-times, and the modulation rate is made low such as BPSK or QPSK. Thereby, a required signal-to-noise ratio can be accomplished. When the propagation condition has improved, a transmitting rate is increased by using a multitone modulation. Furthermore, when a propagation condition is good, a transmitting rate can be raised by reducing the number of symbol-repeat times.

SNR<$SNR_{TH1}$: eight-repeat of symbol with BPSK
$SNR_{TH1}$≦SNR<$SNR_{TH2}$: eight-repeat of symbol with QPSK
$SNR_{TH2}$≦SNR<$SNR_{TH3}$: eight-repeat of symbol with 8 PSK
$SNR_{TH3}$≦SNR<$SNR_{TH4}$: eight-repeat of symbol with 16 QAM
$SNR_{TH4}$≦SNR<$SNR_{TH5}$: four-repeat of symbol with 16 QAM
$SNR_{TH5}$≦SNR<$SNR_{TH6}$: two-repeat of symbol with 16 QAM
$SNR_{TH6}$≦SNR: one-repeat of symbol with 16 QAM According to the present invention, under an inferior propagation condition, the required error rate is satisfied by increasing the number of symbol-repeat times. Conversely, under a good propagation condition, a coding rate is raised by reducing the number of symbol-repeat times.

Furthermore, according to the present invention, the adaptive control based on the propagation condition more finely is also possible by adaptively changing the modulation rate of each symbol.

Furthermore, according to the present invention, the adaptive coding can be performed by combining the ST block coding with the different number of antennas. Thus, same coding rate is accomplished while a transmit power and an interference to other apparatus can be reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of adaptive modulation using a space-time block code matrix from a plurality of antennas, said method comprising the steps of:
    changing adaptively the number of transmission repeat times of said matrix according to a propagation condition,
    transforming modulation signals at each transmission repeat timing from each antenna by using said matrix, and
    sending said transformed signals at each transmission repeat timing from each antenna.

2. A method of adaptive modulation of a signal embedded in a carrier wave using a space-time block code matrix $$\begin{pmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \\ x_1^* & x_2^* & x_3^* & x_4^* \\ -x_2^* & x_1^* & -x_4^* & x_3^* \\ -x_3^* & x_4^* & x_1^* & -x_2^* \\ -x_4^* & -x_3^* & x_2^* & x_1^* \end{pmatrix}$$

from four-antennas, columns are each antenna, rows are each transmission repeat timing, and "*" is a complex conjugate, said method comprising the steps of:
    changing adaptively the number of transmission repeat times of said matrix according to a propagation condition as follows, $$\begin{pmatrix} x_1 & x_2 & x_3 & x_4 \\ -x_2^* & x_1^* & -x_4^* & x_3^* \\ -x_3 & x_4 & x_1 & -x_2 \\ -x_4^* & -x_3^* & x_2^* & x_1^* \\ x_1^* & x_2^* & x_3^* & x_4^* \\ -x_2 & x_1 & -x_4 & x_3 \\ -x_3^* & x_4^* & x_1^* & -x_2^* \\ -x_4 & -x_3 & x_2 & x_1 \end{pmatrix}$$

-continued $$\begin{pmatrix} x_1 & x_2 & x_3 & x_4 \\ -x_2^* & x_1^* & -x_4^* & x_3^* \\ -x_3 & x_4 & x_1 & -x_2 \\ -x_4^* & -x_3^* & x_2^* & x_1^* \end{pmatrix}$$

or $$\begin{pmatrix} x_1 & x_2 & x_3 & x_4 \\ -x_2^* & x_1^* & -x_4^* & x_3^* \end{pmatrix}$$

transforming modulation signals "$x_1$"–"$x_n$" at each transmission repeat timing from each antennas by using said matrix, and
    sending said transformed signals at each transmission repeat timing from each antenna.

3. A method as claimed in claim 1, wherein the number of driving antennas are changed adaptively according to said propagation condition.

4. A method as claimed in claim 1, wherein a modulation scheme of said modulation signals is changed.

5. A method as claimed in claim 1, wherein said propagation condition is of measured by a receiving side.

6. A method as claimed in claim 1, wherein said propagation condition is of measured by a transmitting side.

7. A method as claimed in claim 1, wherein said method comprising the steps of:
    in a transmitting side, interleaving transmitting signals between antennas, and
    in a receiving side, de-interleaving received signals.

8. An apparatus for adaptive modulation using space-time block code matrix from a plurality of antennas, said apparatus comprising:
    means for changing adaptively the number of transmission repeat times of said matrix according to a propagation condition,
    means for transforming modulation signals at each transmission repeat timing from each antenna by using said matrix, and
    means for sending said transformed signals at each transmission repeat timing from each antenna.

9. An apparatus for adaptive modulation using space-time block code matrix $$\begin{pmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \\ x_1^* & x_2^* & x_3^* & x_4^* \\ -x_2^* & x_1^* & -x_4^* & x_3^* \\ -x_3^* & x_4^* & x_1^* & -x_2^* \\ -x_4^* & -x_3^* & x_2^* & x_1^* \end{pmatrix}$$

from four-antennas, columns are each antenna, rows are each transmission repeat timing, and "*" is a complex conjugate, said apparatus comprising:
    means for changing adaptively the number of transmission repeat times of said matrix according to a propagation condition as follows, $$\begin{pmatrix} x_1 & x_2 & x_3 & x_4 \\ -x_2^* & x_1^* & -x_4^* & x_3^* \\ -x_3 & x_4 & x_1 & -x_2 \\ -x_4^* & -x_3^* & x_2^* & x_1^* \\ x_1^* & x_2^* & x_3^* & x_4^* \\ -x_2 & x_1 & -x_4 & x_3 \\ -x_3^* & x_4^* & x_1^* & -x_2^* \\ -x_4 & -x_3 & x_2 & x_1 \end{pmatrix}$$

$$\begin{pmatrix} x_1 & x_2 & x_3 & x_4 \\ -x_2^* & x_1^* & -x_4^* & x_3^* \\ -x_3 & x_4 & x_1 & -x_2 \\ -x_4^* & -x_3^* & x_2^* & x_1^* \end{pmatrix}$$

or $$\begin{pmatrix} x_1 & x_2 & x_3 & x_4 \\ -x_2^* & x_1^* & -x_4^* & x_3^* \end{pmatrix}$$

means for transforming modulation signals "$x_1$"–"$x_n$" at each transmission repeat timing from each antennas by using said matrix, and means for sending said transformed signals at each transmission repeat timing from each antenna.

10. An apparatus as claimed in claim 8, wherein said apparatus comprising means for changing the number of driving antennas adaptively according to said propagation condition.

11. An apparatus as claimed in claim 8, wherein said apparatus comprising means for changing a modulation rate of said modulation symbols.

12. An apparatus as claimed in claim 8, wherein said apparatus comprising means for measuring said propagation condition.

13. An apparatus as claimed in claim 8, wherein said apparatus comprising means for interleaving said transmitting signals between antennas.

* * * * *